(12) United States Patent
Kuwabara

(10) Patent No.: US 6,665,548 B2
(45) Date of Patent: Dec. 16, 2003

(54) WIRELESS COMMUNICATION DEVICE HAVING DISPLAY PANEL

(75) Inventor: Tatsuru Kuwabara, Kariya (JP)

(73) Assignee: Denso Corporation, Kariya (JP)

( * ) Notice: Subject to any disclaimer, the term of this patent is extended or adjusted under 35 U.S.C. 154(b) by 480 days.

(21) Appl. No.: 09/783,731

(22) Filed: Feb. 13, 2001

(65) Prior Publication Data

US 2001/0014617 A1 Aug. 16, 2001

(30) Foreign Application Priority Data

Feb. 14, 2000 (JP) .......................................... 2000-34973

(51) Int. Cl.$^7$ ................................................ H04Q 7/32
(52) U.S. Cl. .................... 455/567; 455/566; 455/414.1; 455/412.2; 455/550.1; 379/100.08; 709/206; 709/200
(58) Field of Search ................................ 455/567, 566, 455/414.1, 412.1, 412.2, 414.4, 403, 550.1, 575.1, 90.3, 415; 379/142.01, 93.23, 100.08, 100.01; 709/206, 200; 84/600, 601, 602

(56) References Cited

U.S. PATENT DOCUMENTS

6,061,570 A * 5/2000 Janow ........................ 455/567
6,252,588 B1 * 6/2001 Dawson ...................... 709/206
6,501,967 B1 * 12/2002 Mäkeläet al. ............... 455/567

FOREIGN PATENT DOCUMENTS

JP            411112660 A    *    4/1999

* cited by examiner

*Primary Examiner*—William Trost
*Assistant Examiner*—Keith Ferguson
(74) *Attorney, Agent, or Firm*—Harness, Dickey & Pierce, PLC

(57) ABSTRACT

In a mobile telephone, a voice call arrival and an electronic mail arrival are notified to a user by respectively different sounds. Such sounds are selected according to user's preference from plural sounds including sound patterns and melodies stored in a memory. To confirm the presently selected sounds, a single frame simultaneously displaying both sounds is displayed on a display panel. The user is able to change the selected sounds to another sounds by inputting instructions from a keypad, using the same frame showing both of the presently selected sounds.

3 Claims, 3 Drawing Sheets

FIG. 3

| PATTERN-1 |
|---|
| PATTERN-2 |
| PATTERN-3 |
| PATTERN-4 |
| PATTERN-5 |
| PATTERN-6 |
| PATTERN-7 |
| PATTERN-8 |
| MELODY-A |
| MELODY-B |
| MELODY-C |
| MELODY-D |
| MELODY-E |

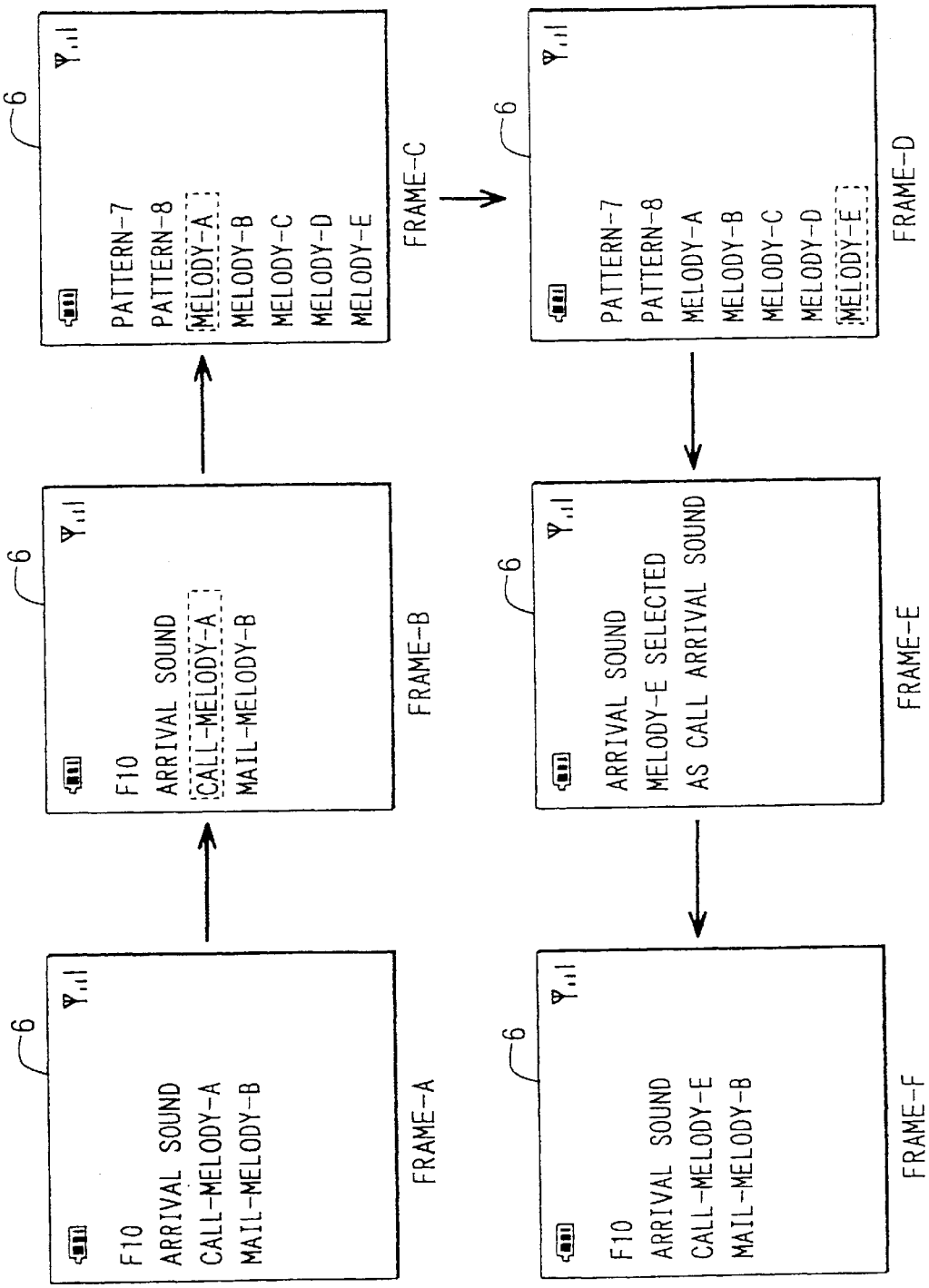

WIRELESS COMMUNICATION DEVICE HAVING DISPLAY PANEL

CROSS-REFERENCE TO RELATED APPLICATION

This application is based upon and claims benefit of priority of Japanese Patent Application No. 2000-34973 filed on Feb. 14, 2000, the content of which is incorporated herein by reference.

BACKGROUND OF THE INVENTION

1. Field of the Invention

The present invention relates to a wireless communication device such as a mobile telephone, and more particularly to such a device having a display panel.

2. Description of Related Art

Wireless communication devices such as mobile telephones and personal handy-phones (PHS) are widely used these days. In some types of the mobile telephones which are capable of receiving both voice calls and electronic mails, a device for notifying a user by a sound which one of the voice call or the electronic mail is being received is included. In this device, a first sound for notifying a user an arrival of a voice call (referred to as a call-arrival sound) and a second sound for notifying a user an arrival of an electronic mail (referred to as a mail-arrival sound) are provided, so that the user is able to differentiate by the sounds the call-arrival and the mail-arrival. Also, a group of sounds including sound patterns and/or melodies, each different from one another, are memorized in a memory, so that the user can select the first and second sounds from among the group of sounds according to his/her preference. The first and second sounds selected can be displayed on a display panel, and those can be changed to other ones by the user, if desired.

However, in such a conventional device, the first sound selected as the call-arrival sound and the second sound selected as the mail-arrival sound are not displayed on the same frame at the same time, but they are displayed one by one separately on respective frames. In other words, the user displays one frame for checking which sound is now selected as the call-arrival sound, and then the other frame for checking which sound is now selected as the mail-arrival sound. This is troublesome for the user.

SUMMARY OF THE INVENTION

The present invention has been made in view of the above-mentioned problem, and an object of the present invention is to provide an improved communication device, in which both of the call-arrival sound and the mail-arrival sound selected are easily checked on a display panel and those are easily changed to other ones.

In a mobile telephone which is capable of receiving voice calls and electronic mails, a first sound notifying a user an arrival of a voice call (a call-arrival sound) and a second sound notifying an arrival of an electronic mail (a mail-arrival sound) are set in the telephone. Both of the call-arrival sound and the mail-arrival sound are selected according to the user's preference from among a plurality of sounds stored in a memory. The plurality of sounds stored in the memory include a ground of sound patterns and a group of melodies.

When the user wants to confirm the sounds presently selected, the user pushes a key to display both of the call-arrival sound and the mail-arrival sound on a single display frame at the same time. To change the presently selected sounds to other sounds, the same display frame showing both of the selected sounds is used. The user inputs instructions from a key pad to change the presently selected sounds to new sounds.

Since both of the call-arrival sound and the mail-arrival sound are simultaneously displayed on a single frame, it is easy to confirm which sounds are presently selected. Further, since the same single display frame is used to change the presently selected sounds to another sounds, it is quite easy to make such changes. This invention is also applicable to other wireless communication devices than the mobile telephones.

Other objects and features of the present invention will become more readily apparent from a better understanding of the preferred embodiment described below with reference to the following drawings.

BRIEF DESCRIPTION OF THE DRAWINGS

FIG. 3 is a list showing a group of sounds consisting of sound patterns and melodies stored in a memory; and FIG. 4 is a series of frames sequentially displayed on the display panel, showing a process of changing a selected sound to another one.

DETAILED DESCRIPTION OF THE PREFERRED EMBODIMENT

Figure 2:
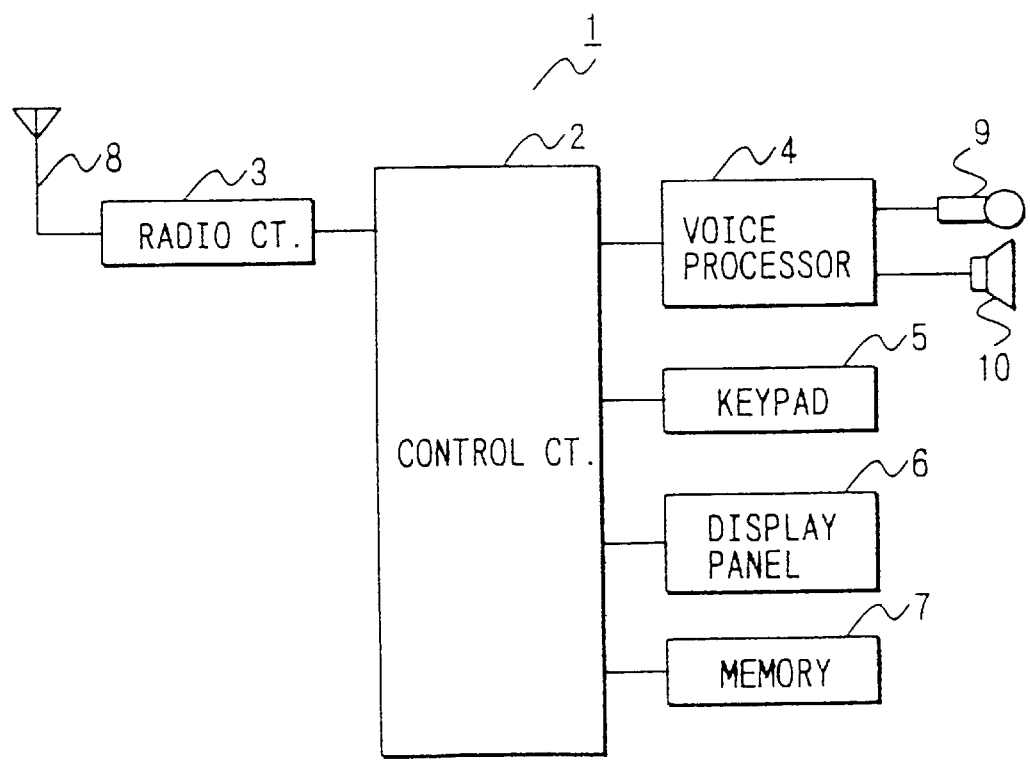
FIG. 2 is a block diagram showing a structure of the mobile telephone of the present invention.

An embodiment of the present invention will be described with reference to the drawings. First, referring to FIG. 2, an electrical connection of a mobile telephone of the present invention will be described. The mobile telephone 1 is composed of: an antenna 8; a radio circuit 3; a control circuit 2; a voice processor 4; a key pad 5; display panel 6; a memory 7; a microphone 9; and a receiver 10, all of those components being electrically connected as shown in FIG. 2.

The radio circuit 3 processes radio signals received through the antenna 8, and processes signals to be sent to a ratio base terminal from the mobile telephone 1. The control circuit 2 mainly composed of a microcomputer controls an entire operation of the mobile telephone 1. The voice processor 4 processes voice information received and feeds its output to the receiver 10. The voice processor 4 also processes voices fed from the microphone 9 and supplies its output to the controller 2. The keypad 5 includes various keys, such as a start-key for starting communication, a stop-key for terminating communication, and ten-keys for inputting telephone numbers and other information. The display panel 6 displays various information concerning communication. The memory 7 stores various data including sound patterns and melodies for indicating the mail-arrival and call-arrival.

As shown in FIG. 3, the memory 7 stores eight sound patterns, pattern-1 to pattern-8, and five melodies, melody-A to melody-E, in this particular embodiment. A first sound for notifying an arrival of a call (a call-arrival sound) is selected by the user from among the sound patterns or melodies stored in the memory 7. Similarly, a second sound for notifying an arrival of an electronic mail (a mail arrival-sound) is selected from among the sound patterns or melodies stored in the memory 7. The selected call-arrival sound is output from the receiver 10 when a call is received by the mobile telephone 1. Similarly, the selected mail-arrival-sound is output when an electronic mail is received.

Figure 1:
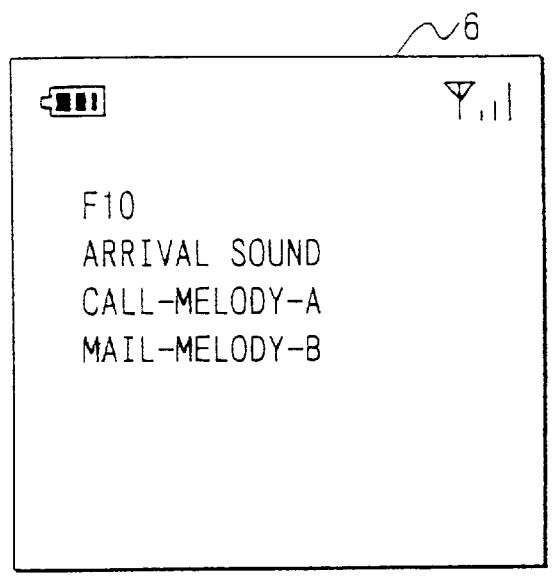
FIG. 1 is a drawing showing a frame displayed on a display panel of a mobile telephone.

To confirm which sounds are selected, the user pushes a predetermined key to display that information on the display panel 6. Both the call-arrival sound and the mail-arrival sound are displayed on a single frame at the same time. Assuming that melody-A is selected as the call-arrival sound and melody-B is selected as the mail-arrival sound, that information is displayed on the display panel 6 in a single frame as shown in FIG. 1. In this manner, the user is able to confirm both selected sounds at the same time.

The selected sounds are easily changed to other ones in the following manner. FIG. 4 shows a sequence of displays for changing the selected sounds. Upon pushing a predetermined key, frame-A showing both sounds presently selected is displayed, i.e., melody-A as the call-arrival sound and melody-B as the mail-arrival sound. If the user wants to change the call-arrival sound, the user highlights "call—melody-A" as shown in frame-B. Then, frame-C showing all the sounds stored in the memory 7 is displayed. Then, if the user instructs by pushing a key to change melody-A to melody-E, "melody-E" is highlighted as shown in frame-D. Then, frame-E confirming melody-E is newly selected as the call-arrival sound is displayed. After a predetermined period of time, e.g., two seconds, has lapsed, frame-F showing that melody-E is now selected as the call-arrival sound and melody-B continues to be selected as the mail-arrival sound is displayed. In this manner, the user is able to easily change the selected sounds.

Since both of the call-arrival sound and the mail-arrival sound selected are displayed on the same frame at the same time by pushing a key, the user can easily confirm the selected sounds. Further, the selected sounds can be easily changed to another sounds according to the user's preference, using the same frame.

Though two sounds respectively notifying the call-arrival and the mail-arrival are set in the foregoing embodiment, it is possible to set a third sound for notifying an arrival of other information, such as a circular mail. It is also possible to set more than three sounds respectively notifying an arrival of different kinds of information. The present invention is also applicable to other radio devices than the mobile telephone, such as a personal handy-phone system (PHS). More than eight sound patterns and five melodies may be stored in the memory to make more choices available to the user. The sequence of display frames exemplified in FIG. 4 may be arbitrarily modified.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A wireless communication device comprising:

means for selectively receiving calls and electronic mails;

means for notifying an arrival of the call or the electronic mail by sound to a user;

means for selecting a first sound notifying the arrival of the call from among a plurality of sounds stored in a memory and for selecting a second sound notifying the arrival of the electronic mail from among the plurality of sounds stored in the memory; and a display panel for simultaneously displaying both of the first and the second sounds selected on a single frame.

2. The wireless communication device as in claim 1, wherein:

the plurality of sounds stored in the memory include plural sound patterns and plural melodies.

3. The wireless communication device as in claim 1, wherein:

the selecting means is capable of changing the selected first and second sounds to other sounds, respectively, using the frame simultaneously displaying both of the first and the second sounds selected.

* * * * *